United States Patent [19]

Johnson et al.

[11] Patent Number: 4,518,681

[45] Date of Patent: May 21, 1985

[54] PROCESS FOR THE MANUFACTURE OF SYNTHETIC PAPER AND THE PRODUCT THEREOF

[75] Inventors: Oscar Johnson, Reynoldsburg; Robert A. Luecke, Newark, both of Ohio

[73] Assignee: The Dow Chemical Company, Midland, Mich.

[21] Appl. No.: 571,121

[22] Filed: Dec. 23, 1983

Related U.S. Application Data

[63] Continuation of Ser. No. 277,318, Jun. 25, 1981, abandoned.

[51] Int. Cl.$^3$ ............................ G03C 1/76; B05D 3/06
[52] U.S. Cl. .................................... 430/532; 204/168; 427/40; 427/41; 430/536; 430/537
[58] Field of Search ................. 204/165, 168; 427/39, 427/40, 41; 430/517, 531, 532, 536

[56] References Cited

U.S. PATENT DOCUMENTS 3,840,625  10/1974  Yamamoto et al. .................. 264/41

FOREIGN PATENT DOCUMENTS

| 1929339 | 12/1969 | Fed. Rep. of Germany . |
| 1934096 | 2/1970 | Fed. Rep. of Germany . |
| 2558393 | 6/1976 | Fed. Rep. of Germany ...... 204/296 |
| 377644 | 6/1964 | Switzerland . |
| 1257512 | 12/1971 | United Kingdom . |
| 1421046 | 1/1976 | United Kingdom . |

*Primary Examiner*—John F. Niebling
*Attorney, Agent, or Firm*—Stephen S. Grace; Bruce M. Kanuch; Michael L. Winkelman

[57] ABSTRACT

An improved process for making synthetic paper/film from a blend of polystyrene and polyethylene resins wherein titanium dioxide is employed as the sole inorganic filler and the film is given an oxidizing post-treatment, such as corona discharge or surface sulfonation. The film so-prepared has improved adhesion to photographic gel emulsions.

8 Claims, No Drawings

PROCESS FOR THE MANUFACTURE OF SYNTHETIC PAPER AND THE PRODUCT THEREOF

CROSS-REFERENCE

This application is a continuation of our copending application Ser. No. 277,318, filed on June 25, 1981, now abandoned.

BACKGROUND OF THE INVENTION

There are a variety of synthetic papers utilized as backing film for photographic gel emulsions. One such synthetic paper/film is formed from a polymer blend comprising a styrene polymer resin, an ethylene polymer resin and an inorganic filler. A synthetic film formed from such a blend is subsequently coated with the photographic gel emulsion and utilized for photographic applications such as phototypesetting film in the newspaper industry and/or as a color print base in commercial photography.

A critical feature of a synthetic film/gel emulsion photographic paper is the degree of adhesion between the film and the gel emulsion. A synthetic paper which is capable of a combination of good dry adhesion and wet adhesion to a photographic gel emulsion is highly desirable.

SUMMARY OF THE INVENTION

The present invention involves an improved method of preparing a synthetic film from a blend of a styrene polymer resin, an ethylene polymer resin and an inorganic filler so as to provide a film which has the capability of enhanced adhesion to a photographic gel emulsion. The improvement comprises (1) utilizing titanium dioxide as the sole inorganic filler in such blend and (2) after the film is formed, oxidizing at least one surface of such film. By utilizing titanium dioxide as the inorganic filler material and post-treating the film surface, a photographic gel emulsion subsequently applied has improved adhesion to this film over synthetic paper containing fillers other than titanium dioxide or one which has not been given the oxidizing post-treatment.

In the blend utilized to make the synthetic film, styrene polymer resin is normally employed as the majority component, that is, greater than 50 weight percent of the total blend is styrene polymer resin. Usually also present in the blend is an elastomer component which improves the physical properties of the synthetic film so-produced.

The preferred means of oxidizing the film surface are corona discharge and surface sulfonation; two well-known techniques for oxidizing polymer surfaces.

DETAILED DESCRIPTION OF THE INVENTION

The term "styrene polymer resin" refers to polystyrene, copolymers of styrene with one or more copolymerizable ethylenically unsaturated monomers, or blends or grafts of polystyrene with synthetic elastomeric polymers. The term "styrene" is used to denote not only styrene but also alkyl-substituted derivatives of styrene such as α-methyl styrene. Examples of suitable styrene polymer resins are polystyrene, high impact polystyrene, an acrylonitrile styrene copolymer, an acrylonitrile butadiene styrene resin, a methyl methacrylate-styrene copolymer or poly-α-methylstyrene.

The term "ethylene polymer resin" refers to polyethylene or copolymers of ethylene with one or more copolymerizable ethylenically unsaturated monomer. Suitable ethylene polymer resins include high density polyethylene, medium density polyethylene, low density polyethylene, chlorinated polyethylene, ethylene-higher alkene copolymers, ethylene-vinyl acetate copolymers, ethylene-vinyl chloride copolymers, ethylene-ethyl acrylate copolymers, and ethylene-acrylic acid copolymers and ionomers.

Mixtures of styrene polymer resins as well as mixtures of ethylene polymer resins can be used.

As noted above, the blend utilized to make the synthetic film preferably also contains an elastomer polymer compound such as polybutadiene, a styrene-butadiene rubber, and an acrylonitrile-butadiene rubber, which is known in the art to improve the physical properties of the synthetic film so-produced. In one aspect, this elastomer compound acts as a compatibilizer between the styrene polymer resin and the ethylene polymer resin.

A critical element of the method of the present invention is utilizing titanium dioxide as the sole inorganic filler in the synthetic film blend. The titanium dioxide may be obtained from a variety of commercial sources.

In a preferred embodiment of the present invention, the blend comprises from about 78 to about 88 weight percent styrene polymer resin, from about 3 to about 6 weight percent ethylene polymer resin, from about 3 to about 6 weight percent of an elastomer compound, and from about 6 to about 10 weight percent titanium dioxide. Most preferably, such blend is prepared from thermoplastic styrene-butadiene copolymer (high impact polystyrene), ethylene homopolymer and an elastomeric styrene-butadiene star block copolymer compatibilizer and titanium dioxide. The individual blend components and the overall blend can also include other additives which are normally incorporated into resin blends such as stabilizers, anti-static agents, plasticizers, colorants, and anti-oxidants.

In particular, an antistatic quality of the film of the present invention can be imparted in a variety of ways. Known antistat additives, such as polyethylene oxide, can be incorporated into the overall resin blend or blended with a portion of the resin which is then coextruded as a thin layer on the side of the base film which is not to receive the gel emulsion. It has also been observed that surface sulfonation, a preferred technique of film post-treatment, also provides the film with an antistatic character.

The blend components can be mixed together in any order and the blend so-made prepared into a film by conventional techniques, such as extrusion or blown bubble methods. Film thickness generally utilized in newspaper applications is within the range of from about 2 to about 5 mils; that generally used in commercial photography is within the range of from about 8 to about 10 mils.

In another critical aspect of the present invention, the film made from the prescribed blend is given an oxidizing post-treatment prior to contact or coating with a photographic gel emulsion. Preferably, this oxidizing post-treatment is carried out by corona discharge or surface sulfonation. Such treatment techniques for polymer surfaces are well known in the art. Corona discharge treatment can be effected in air and atmospheric pressure with conventional equipment using a high frequency, high voltage generator. Discharge is conveniently accomplished by passing the film over a dielectric support roller at a discharge station at a prescribed film speed. The discharge electrodes (treater bar) are positioned a short distance from the moving film surface.

Surface sulfonation of the synthetic film can be carried out in the vapor phase using gaseous sulfur trioxide, normally in an inert diluent such as carbon dioxide, nitrogen or air. The surface sulfonation can also be carried out in a liquid phase utilizing dilute sulfur trioxide in an inert liquid such as a chlorinated solvent.

Oxidation of the film surface can be measured by a wetting test value. Generally an untreated film surface has a wetting tension of 34 to 38 dynes/cm. Film surface oxidation or activation by corona discharge, surface sulfonation or similar treatment produces a film surface wetting tension above 40 dynes/cm. Corona discharge treatment conditions such as time, temperature, power output, electrical potential, distance of the treater bar from the moving film and other variables can be adjusted so long as this increased wetting tension is obtained. The same can be said for sulfonation conditions such as time, temperature, sulfur trioxide concentration and the amount of surface sulfonation obtained.

By utilizing the improvement of the present invention, a synthetic film is produced which has the capability of improved overall adhesion to a photographic gel emulsion. This adhesion is measured by a combination of dry (so-called pre-dry and post-dry adhesion) and wet adhesion.

EXAMPLE 1

A synthetic film was prepared from a blend comprising (percent by weight) 88 percent styrene-butadiene co-polymer, 3 percent low density ethylene homopolymer, 3 percent of a styrene-butadiene star-block copolymer and 6 percent titanium dioxide. The titanium dioxide was blended with the polyethylene and this preblend admixed with the polystyrene and the block copolymer. The film was prepared from such blend by conventional extrusion on blown film equipment. The film so-produced, 4 mils thick, was post-treated by subjecting a surface of such film to corona discharge or surface sulfonation. The amount of corona discharge was measured in terms of watt density, which equals the voltage times the amperage divided by the treater bar width in feet times the film speed in feet per minute.

A gel emulsion stock solution was prepared by admixing 462 grams of water with 71.4 grams of gelatin, heating the mixture to 100° F. to dissolve the gelatin, adding 30 milliliters (ml) of methanol, then adding 119 ml of Congo Red solution (17.5 grams/1000 ml of water) and 10.5 grams of Saponium solution (111 grams/1000 ml of water). The stock solution was divided into 99 gram portions and stored at about 40° F. until used.

The photographic gel emulsion was coated onto the oxidized surface of the film. The film surface and the gel portion (previously admixed with 0.38 ml of formaldehyde) were heated to about 100° F. The film coated with the gel (0.2 micron thickness) was allowed to cool to 40°–45° F. and then post-heated to 95° F. for 30 minutes to dry. After aging overnight at room temperature, the following pre-dry, wet and post-dry adhesion measurements were made on film samples.

Pre-dry Adhesion—a film sample was scribed into 25 squares. A #610 grade Scotch Brand adhesive tape was contacted with the entire sample and hand pressure applied to attempt to pull the gel away from the film substrate. The tape was pulled until one or more squares failed or a maximum of 8 pulls if no failure was observed. The number of squares out of the 25 squares in which the gel did separate from the film substrate were counted. For convenience, the film sample so-tested was graded from 1 to 5 (1=no failure; 2=1 or 2 failures; 3=3 to 5 failures; 4=6 failures; and 5=7 or more failures).

Wet Adhesion—film samples were immersed in commercial photographic developer at a pH of 9-10 for 5 minutes, rinsed and immersed in photographic fixer solution for 2 minutes, and finally washed in water for 2 minutes. Following such washing, the gel-coated film surface was scribed into 9 diamond-shaped figures with a hand-held fork. A hand-held piece of cork was then vigorously rubbed over the scribed surface. The diamonds in which the gel came loose from the film substrate were observed. For convenience, the film after measurement was categorized as 1 (essentially no failure ) or 5 (1 or more diamonds with 25% or more of gel loosened from the diamond).

Post-dry Adhesion—film samples were subjected to the above developer/rinse/fixer/wash cycle noted under wet adhesion test. After the samples had aged overnight at room temperature, they were scribed into 25 squares and tested as done with samples of film in the pre-dry adhesion test. Film samples were categorized accordingly.

Film samples containing $TiO_2$, subjected to corona discharge (24 watt density) and then coated with the gel emulsion, all as described above, exhibited a pre-dry and post-dry adhesion value of 1—no failure, although the wet adhesion value was 5. Similar results were obtained for samples subjected to corona discharge at 8, 9.5 and 16.4 watt densities.

Other film samples containing $TiO_2$, subjected to surface sulfonation (gaseous treatment) and then coated with the gel emulsion, all as described above, exhibited pre-dry, post-dry and wet adhesion values of 1—no failure.

Similar pre-dry, post-dry and wet adhesion tests were run on other film samples prepared from blends of the same materials as noted above except that the inorganic filler instead of titanium dioxide was barium titanate, calcium carbonate, calcium carbonate/titanium dioxide blend, silicon dioxide, or silicon dioxide/titanium dioxide blend. In each of these cases, film samples tested measured pre-dry and post-dry adhesion values of 5 as well as a wet adhesion value of 5. This demonstrates the improved dry adhesion and overall adhesion achieved by the improvement of the present invention.

EXAMPLE 2

Film samples were prepared from the following polymer blends (weight percent): 10 percent styrene homopolymer, 77 percent styrene-butadiene copolymer (high impact polystyrene), 3 percent ethylene homopolymer, 3 percent elastomeric styrene-butadiene star-block copolymer, and 7 percent titanium dioxide. Blown film (4 mils thickness) was prepared from the above blend.

Film samples were then subjected to corona discharge treatment of watt density of 8, 16 and 24. Measurement of the resulting oxidized surface showed an increase in wetting tension from about 36 dynes/cm to greater than 40 dynes/cm.

Film samples were then coated with a photographic gel emulsion (0.2 micron layer) as in Example 1. Adhesion values for pre-dry, wet and post-dry adhesion were made on the film samples. Film samples not containing TiO₂ were also coated and tested (Comparative). The table below give the results.

TABLE

| Example | Watt Density | Pre-Dry | Wet | Post-Dry |
|---|---|---|---|---|
| Comparative | 8 | 5 | 5 | 5 |
| Example 1 | 8 | 3 | 5 | 3 |
| Comparative | 16 | 5 | 5 | 5 |
| Example 2 | 16 | 1 | 5 | 5 |
| Comparative | 24 | 5 | 5 | 5 |
| Example 3 | 24 | 2 | 2 | 2 |

What is claimed is:

1. In a method of preparing a synthetic film having adhered thereto a photographic gel emulsion wherein the synthetic film comprises a blend comprising a styrene polymer resin, an ethylene polymer resin, and an inorganic filler, the improvement which comprises utilizing titanium dioxide as the sole inorganic filler and oxidizing at least one surface of the film so-prepared, thereby obtaining a synthetic film having the capability of enhanced adhesion to a photographic gel emulsion and adhering a layer of photographic gel emulsion to said oxidized surface of said synthetic film.

2. The improvement of claim 1, wherein the blend comprises from about 78 to about 88 weight percent styrene polymer resin, from about 3 to about 6 weight percent ethylene polymer resin, from about 3 to about 6 weight percent of an elastomeric polymer compound, and from about 6 to about 10 weight percent titanium dioxide.

3. The improvement of claim 2, wherein the styrene polymer resin is styrene homopolymer or thermoplastic styrene-butadiene copolymer, the ethylene polymer resin is ethylene homopolymer and the elastomeric compound is a styrene-butadiene star-block copolymer.

4. The improvement of claim 1, wherein the film surface is oxidized by corona discharge.

5. The improvement of claim 4, wherein the watt density employed in the corona discharge treatment is greater than about 8.

6. The improvement of claim 1, wherein the film surface is oxidized by surface sulfonation.

7. The improvement of claim 1, wherein the blend also includes an anti-static agent.

8. A synthetic film having adhered thereto a layer of a photographic gel emulsion prepared by the improved method of claim 1.

* * * * *